UNITED STATES PATENT OFFICE.

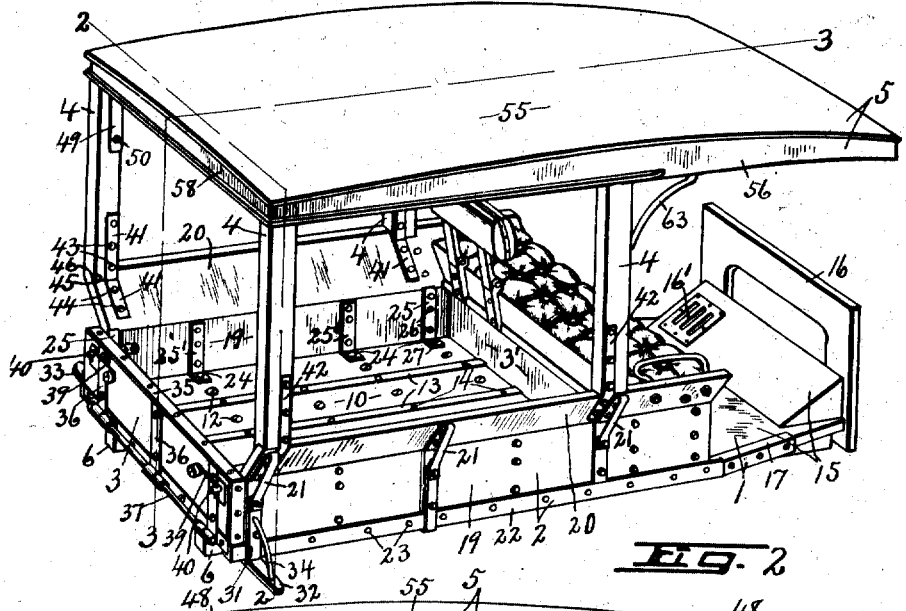

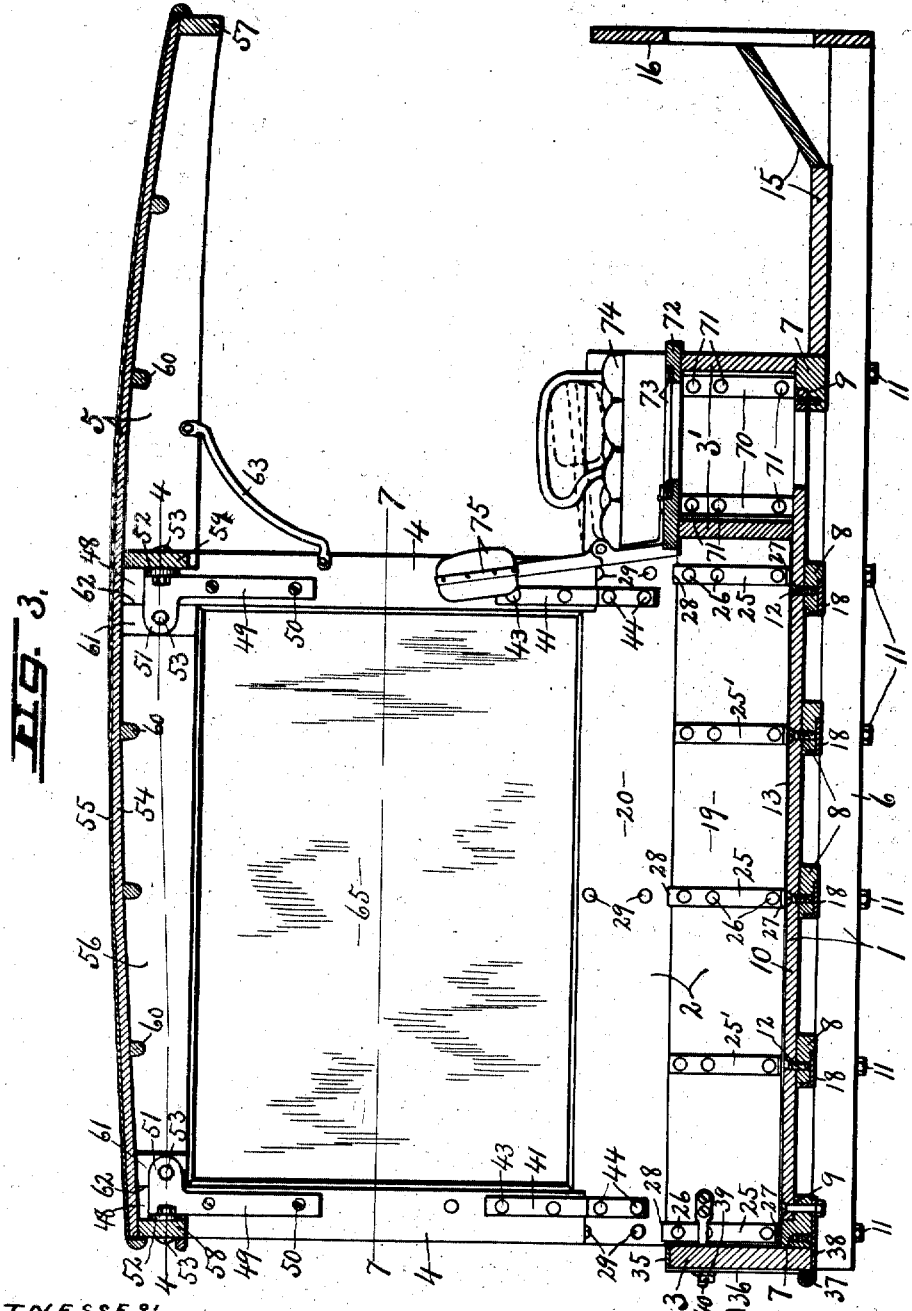

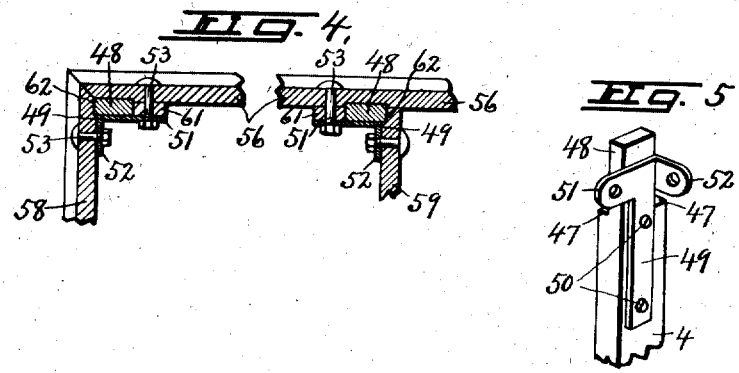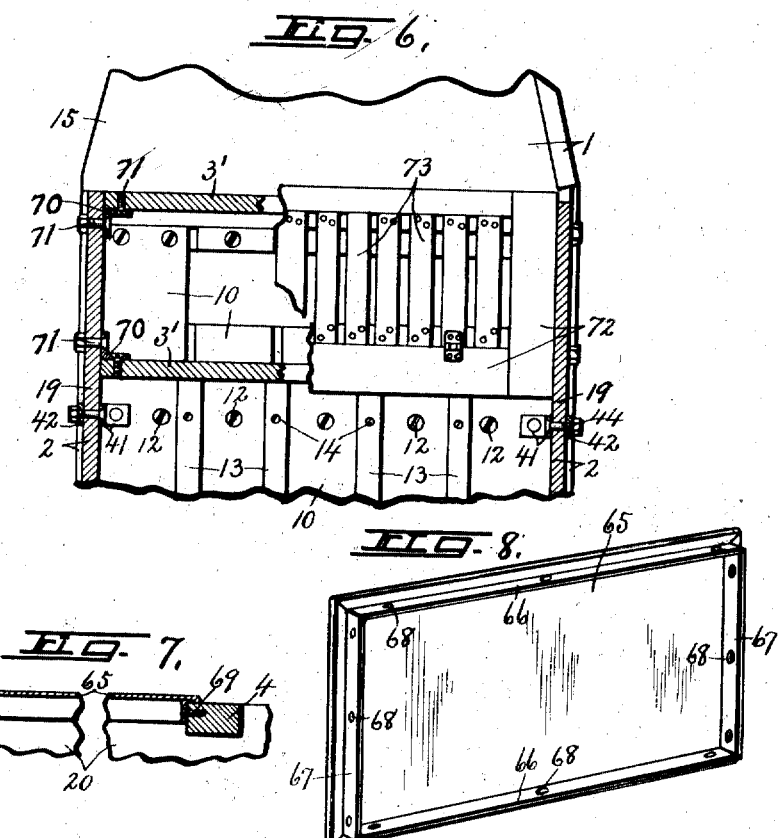

FRANCIS G. DAVIS, OF WATERTOWN, NEW YORK, ASSIGNOR TO H. H. BABCOCK COMPANY, OF WATERTOWN, NEW YORK, A CORPORATION OF NEW YORK.

VEHICLE-BODY.

1,229,589.

Specification of Letters Patent.  Patented June 12, 1917.

Application filed October 13, 1915.  Serial No. 55,631.

*To all whom it may concern:*

Be it known that I, FRANCIS G. DAVIS, a citizen of the United States of America, and resident of Watertown, in the county of Jefferson, in the State of New York, have invented new and useful Improvements in Vehicle-Bodies, of which the following, taken in connection with the accompanying drawings, is a full, clear, and exact description.

This invention relates to certain improvements in vehicle bodies adapted to be used more particularly for motor delivery trucks and similar vehicles.

The main object is to provide a comparatively light, strong, and durable knock-down vehicle body which is made in separate units comprising a platform, separate side and end pieces constituting a box and a suitable top carried by separate uprights rising from the side pieces so that the vehicle may be used with the platform independently of the sides and top for carrying special loads not capable of being carried in the box, or the box may be used with or without the top as may be desired with the assurance that the individual or assembled units will perform their respective functions with a maximum degree of security.

Another object is to provide simple means for easily and quickly connecting the units in such manner as to produce a maximum degree of firmness, strength and durability, thereby reducing the liability of wear and rattle incidental thereto.

Other objects and uses relating to specific parts of the body will be brought out in the following description.

In the drawings—

Figure 1 is a perspective view of a motor truck embodying the various features of my invention.

Fig. 2 is an enlarged transverse vertical sectional view of the same body, taken on line 2—2, Fig. 1, except that the central portion of the uprights for supporting the top are broken away.

Fig. 3 is an enlarged longitudinal vertical sectional view taken on line 3—3, Fig. 1.

Fig. 4 is a horizontal sectional view, partly broken away, taken in the plane of line 4—4, Fig. 3.

Fig. 5 is a detail perspective view of the upper portion of one of the uprights for supporting the top.

Fig. 6 is a top plan, partly in section, of a portion of the box, showing the transverse partitions which brace the sides and constitute at the same time a compartment for the fuel tank and a support for the seat.

Fig. 7 is a detail horizontal sectional view, partly broken away, taken in the plane of line 7—7, Fig. 3, showing a portion of the panel and manner of securing the same to the uprights.

Fig. 8 is a perspective view of the detached panel.

As illustrated, this motor vehicle body comprises a platform —1— and separate side and end pieces 2—2 and —3— and —3'—, constituting the box, a plurality of, in this instance four, uprights —4— rising from the sides —2— and a top —5— mounted upon the upper ends of the uprights.

The platform —1— is made up as a unit to be used independently of the box and other parts carried thereby and comprises a pair of parallel lengthwise sills —6— arranged in substantially spaced relation and rigidly held in such relation by superposed end and intermediate cross bars 7—7 and —8—, the end bars —7— being somewhat thicker vertically than the intermediate bars —8— and rabbeted at —9— along their inner upper corners for receiving the adjacent ends of a floor —10— having its intermediate portions resting upon the upper faces of the cross bars —8—.

These cross bars —7— and —8— are arranged in substantially spaced relation lengthwise of and upon the upper edges of the sills —6— and together with the floor —10— are secured to said sills by bolts —11— which are passed through registering apertures in the adjacent portions of the sills, cross bars and floor, as shown more clearly in Fig. 2.

The floor —10— preferably consists of a series of lengthwise parallel strips of wood rigidly secured to the cross bars —7— and —8— by screws —12— or equivalent fastening means and having their adjacent edges spaced a slight distance apart and also firmly clamped to the cross bars by lengthwise metal strips —13— which cover the joints between the edges of the flooring strips and are secured to the cross bars by screws —14—.

These metal strips —13— extend lengthwise of the floor between the ends —3— and

—3'— and serve as wear plates to relieve the upper surface of the wood floor boards from excessive wear by objects which are moved across and upon the floor.

The sills —6— are extended forwardly some distance beyond the front end pieces —3— for receiving and supporting suitable foot boards —15— and a dash —16—, the front foot board —15— being inclined upwardly and forwardly and provided near one end with a slotted plate —16'— for receiving the pedal levers, not shown, but commonly used in motor vehicles of this character, the outer opposite edge of the horizontal foot board —15— being covered by an angle-iron or metal wear plate —17— to prevent undue wear of this edge of the board by the driver and others passing to and from the seat of the vehicle.

The intermediate cross bars —8— are reinforced along their lower rear corners by the metal angle-irons or plates —18— which are secured to the cross bars —8— by screws —18'— and extend from end to end of their respective bars, the object of said reinforcing plates being to stiffen the cross bars against sagging under load, and also to form metal bearings adapted to be engaged by other metal bearings on the side pieces —2— for establishing a firmer connection with said side pieces when they are assembled in a manner hereinafter described.

It is to be understood, however, that the platform *per se* may be used independently of any of the other parts of the body as a practical means for supporting loads which cannot be conveniently carried in a box.

Each of the side pieces —2— is also made up as a unit to be applied when desired to the platform and comprises an upright piece —19— and a wing —20—, both preferably made of wood of suitable width and of substantially the same length, the wing —20— inclining upwardly and outwardly from the upper edge of the board —19— and rigidly secured thereto by metal braces —21— presently described.

The lower edge of each of the side boards —19— is reinforced by a metal-angle plate —22— having one of its sides secured to the outer face thereof by screws or rivets —23— and its other side extended under and inwardly some distance beyond its inner face so as to underlie and engage the adjacent end of the metal reinforcing plate —18— of the platform when the side pieces are placed in operative relation to said platform to form the box, as shown in Fig. 2.

When these side pieces are placed in operative position to form the box, their lower edges abut against the adjacent outer edges of the platform and extend lengthwise thereof between the end pieces —3— and —3'—, in which position the inwardly projecting flanges of the angle plates —22— serve to support the adjacent edges of the platform —1— and permit said platform to be secured to those flanges by bolts —24—, thus bringing the ends of the metal reinforcing plates —18— to bear upon the metal plates —22— to prevent excessive wear at the junctions of the sides with the platform, and also establishing a more rigid and secure connection.

As a further means for reinforcing the side boards —19— for stiffening the connection between the side boards and platform, the brackets —21— are provided with extensions —25— secured flatwise by bolts —26— against the inner face of said side boards and terminating in inwardly projecting flanges —27—, which, when the sides and platform are assembled to form the box, are secured flatwise to the upper faces of the adjacent edges of the platform by the same bolts —24— which secure the plates —22— to the under side of the same edges of the platform, thereby firmly securing the adjacent longitudinal edges of the platform between the flanges —27— and plates —22—.

The intermediate portions of the brackets —21— are offset laterally and outwardly at —28— across and upon the upper edges of the side boards —19—, or rather between the adjacent edges of said side boards and wings —20—, the brackets being then extended upwardly across and against the outer faces of said wings and secured thereto by bolts —29—, while the outer ends of the brackets are overturned downwardly and are secured to the side boards —19— by one of the bolts —26— at each side.

Additional reinforcing plates —30— and —31— are secured to the outer sides of the side boards —19— by the same fastening bolts —26—, the plates —30— lying next adjacent the boards —19— between the offset —28— of the bracket —21— and upper edge of the inner plate 22, while the reinforcing plates —31— are secured to the outer faces of the plates —30— and —22—.

The plates —31— nearest the rear end board terminate at their lower edges in outwardly projecting flanges —32— running in substantially the same horizontal plane as the lower flanges of the plates —22—, thus permitting the use of metal-connecting plates —33— which are secured to said horizontally projecting flanges of the plates —22— and —31— by the bolts —24— and arched braces —34—, the lower ends of said arched braces being passed through registering apertures in the flange —32— and plate —33— and riveted thereto, while their upper ends are riveted in the upright portions of the plate —31—, as shown in Fig. 2.

These lateral extensions —32— and reinforcing plates —33—, together with the arched braces —34—, are important in a structure of this character in that they serve to hold the rear ends of the sides firmly in place against springing outwardly, particularly when the rear end board is down or detached.

The braces —21— connected in the manner described are also important in establishing a rigid connection between the wings —20— and side boards —19—, which permits the super-structure to be mounted directly upon the wings without liability of springing or displacing such wings.

The rear end board —3— is of substantially the same height and width as the box proper exclusive of the sills so as to abut against the rear face of the cross bar —7— and rear end faces of the sides —19—, and preferably consists of a board having metal wear plates or bands —35— secured to its upper longitudinal edge and also to its end edges, said end board being additionally reinforced by transverse metal plates —36— secured to its rear face and constituting hinge straps which are pivotally connected by pintles —37— to similar hinge straps —38—, the latter being secured to the under side of the rear cross bar —7—, as shown in Fig. 3.

The rear end or gate —3— is held in its closed position by hooks —39— which are pivoted to said end piece and are movable into and out of engagement with apertured bolts —40—, the latter being secured to the inner faces of the sides —19— so as to project rearwardly through apertures in the end piece and constitute portions of the side pieces.

The upright posts —4— for supporting the top —5— are of similar construction and rise from the upper edges of the wings —20— at the four corners of the box proper, each post being preferably made of wood and having its lower portion reinforced by metal plates —41— and —42— secured, respectively, to the inner and outer faces thereof by bolts —43— and having their lower ends extended downwardly some distance beyond the lower edges of the wood portions and inclined downwardly and inwardly at the same angle as the adjacent wing —20— and in spaced relation to receive said wing, so that when the posts are assembled upon their respective wings, the extensions may be secured to the inner and outer faces thereof by bolts —44—.

The transverse thickness of the posts is slightly greater than that of the wings to which they are adapted to be secured, and in order that they may be properly alined with the upper edges of the wings, the inner sides of their lower ends are provided with beveled extensions —45— fitting against the inner faces of the adjacent portions of said wings, while the outer portions of the same ends are formed with horizontal shoulders —46— adapted to rest upon the upper edges of the wings, the beveled extensions —45— serving to aid the inwardly inclined extensions of the metal reinforcements —41— and —42— in firmly holding the posts in an upright position and in fixed relation to the sides —2—.

The outer portions of the upper ends of the posts —4— are rabbeted at —47— to receive the lengthwise rails of the top —5—, hereinafter described, thus forming tongues —48— of reduced thickness adapted to enter sockets in the under side of said top, the inner faces of the upper ends of said posts being reinforced by metal plates —49— secured thereto by screws —50— and having their upper ends provided with apertured offsets —51— and —52— which are disposed at substantially right angles to each other for securement to the inner faces of the side, front and rear rails of the top by bolts —53— at opposite sides of the corresponding tongues —48—.

The top —4— is of sufficient length and width to cover the entire platform and, therefore, overhangs the box and seat as well as the extension —15— of the platform, and comprises a ceiling —54— which is slightly arched longitudinally and transversely to shed water therefrom and is preferably covered by a layer —55— of waterproof material, said ceiling being rigidly secured to a suitable frame-work, consisting, in this instance, of opposite lengthwise side rails —56—, front and rear end rails —57— and —58— and an intermediate rail —59—, together with a plurality of cross ribs or bows —60—, all of said frame-work, ceiling and top being rigidly secured together to form a unitary structure.

The side rails —56— are provided with vertical cleats —61— rigidly secured to the inner faces thereof relatively short distances inwardly from the end and intermediate cross rails —58— and —59— to form sockets —62— of substantially the same width as the tongues —48— on the upper face of the posts —4—, said cleats being of substantially the same transverse thickness as the tongues so that when the top is placed in operative position with the tongues —48— in their respective sockets —62—, the inner faces of the cleats and tongues will be substantially flush, while the offsets —51— of the reinforcing plates —49— will extend across said sockets, and when secured to the inner faces of the cleats by bolts —53—, will firmly hold the top against lateral movement relatively to the posts, the junctions of the rear end and intermediate rails —58— and —59— with the side rails of the top being additionally stiffened by the securement of the angular offsets —51— and —52— thereto.

The forwardly projecting portion of the top may be additionally supported by braces —63— connecting said extensions with the front posts —4— in the manner shown more clearly in Figs. 1 and 3.

The lower edges of the side rails —56— between the front and rear posts —4— are substantially parallel with the upper edges of the wings —20—, while the upright edges of the front and rear posts at each side of the body are also parallel and disposed at substantially right angles to the lower edges of the side rails of the top, thus producing a rectangular opening, in which may be fitted a panel —65—, preferably of metal, having side and end flanges —66— and —67— parallel with and a short distance from the edges thereof so as to fit snugly in the side openings between the posts and also between the side rails —56— and wings —20—, said flanges being provided with apertures —68— for receiving suitable fastening means, as screws —69—, by which the panels may be firmly held in place with the portions thereof at the outside of the flanges bearing against the outer faces of the posts and also against the outer faces of the side rails —56— and wings —20—.

The front end pieces —3'— forming the compartment for the fuel tank and support for the seat are disposed in parallelism transversely of the platform, upon which their lower edges rest with their upper edges coincident with the upper edges of the side pieces —19— and their ends abutting against the inner faces of said side pieces, to which latter they are rigidly connected by upright angle plates —70— at the four corners of the compartment, said angle plates being secured to the inner faces of the sides —19— and cross pieces —3'— by bolts —71—.

A seat supporting frame —72— is suitably secured to the upper edges of the cross pieces —3'— between the sides —2— and is provided with a hinge section —73— to permit access to the interior of the compartment when the seat, as —74—, is removed, said seat being provided with a swinging back section —75— which may be folded down upon the cushion, as indicated by dotted lines, when desired.

The side boards —19— of the box are also reinforced by metal plates —25'— similar to the extensions —25— of the brackets —21—, except that they terminate at the upper edges of said side pieces instead of being extended across the upper edges thereof.

It is now clear from the foregoing description that the entire top as a unit may be removed by simply removing the bolts —53— and lifting the top upwardly from the upper ends of the posts. In a similar manner, the posts may be speedily removed from the wings by removing the bolts —44—, thus permitting the posts with the reinforced plates —41— and —49— thereon to be lifted upwardly and displaced from the wings, leaving the box and seat securely fastened to the platform.

If desired, the rear end piece —3— may be removed by detaching the hooks —39— and withdrawing the pintles —37—, or if it is desired to use the platform —1— without the box, the side pieces —2— with the front end pieces —3'— carrying the seat frame —72— and seat may be removed as a unit by simply removing the bolts —24—, or the side pieces may be separated from the end pieces —3'— by removing the bolts —71— in addition to the removal of the bolts —24—.

By making the several parts of the body in separate units as described extends the range of usefulness of the same body and at the same time enables the units to be packed, shipped or stored in a knock-down condition within a comparatively small compact space.

What I claim is:

1. In a vehicle body, the combination of a platform, vertically disposed side boards abutting against the longitudinal edges of the platform and provided with flanged members engaging the upper and lower faces of said edges and bolted thereto, said side boards being provided with wings inclining upwardly and outwardly from their upper edges, and braces having portions thereof interposed between the meeting edges of the wings and main bodies of the sides and other portions secured, respectively, to the inner faces of the main bodies and to the outer faces of the wings.

2. In a vehicle body of the character described, the combination of a platform, opposite upright side boards abutting against the longitudinal edges of the platform, wings inclining upwardly and outwardly from the upper edges of the side boards, and metal reinforcing strips bolted to the inner faces of the side boards and terminating in flanges bolted to the upper faces of the adjacent edges of the platform, the intermediate portions of said strips being extended across and between the meeting edges of the side pieces and wings, and their upper portions secured to the outer faces of the wings.

3. In a vehicle body of the character described, the combination of a platform, side boards abutting against the opposite longitudinal edges of the platform, wings inclining upwardly and outwardly from the upper edges of the side boards, and braces extending across and between the meeting edges of the wings and side boards and having their upper portions bolted to the outer faces of the wings and their lower portions bolted to the inner faces of the side boards and provided with inwardly projecting flanges bolted to the upper faces of the adjacent edges of the platform.

4. In a vehicle body of the character described, the combination of a platform, side boards abutting against the opposite longitudinal edges of the platform, wings inclining upwardly and outwardly from the upper edges of the side boards, and braces extending across and between the meeting edges of the wings and side boards and having their upper portions bolted to the outer faces of the wings and their lower portions bolted to the inner faces of the side boards and provided with inwardly projecting flanges bolted to the upper faces of the adjacent edges of the platform, the upper portions of the braces being returned downwardly at the outer sides of the side boards and bolted thereto.

5. In a vehicle body of the character described, the combination of a platform, side boards abutting against the longitudinal edges of the platform and provided with flanged members engaging the upper and lower faces of said edges and bolted thereto, the inner members being extended transversely across the upper edges of the side boards and upwardly therefrom to form braces and side wings bolted to the braces.

6. In a vehicle body of the character described, the combination of a platform, opposite side pieces having their lower portions abutting against the adjacent longitudinal edges of the platform and provided with flanged members engaging the upper and lower faces of the adjacent portions of said platform and bolted thereto, the upper edges of the side pieces being provided with upwardly extending members in spaced relation, and posts having their lower ends inserted between said spaced members and bolted to the side pieces.

In witness whereof I have hereunto set my hand this 4th day of October, 1915.

FRANCIS G. DAVIS.

Witnesses:
 HOWARD L. TILDEN,
 JNO. A. BYRNES.